April 21, 1925. 1,534,682
S. M. CARMEAN ET AL
ELECTRIC HEATER
Filed April 11, 1924
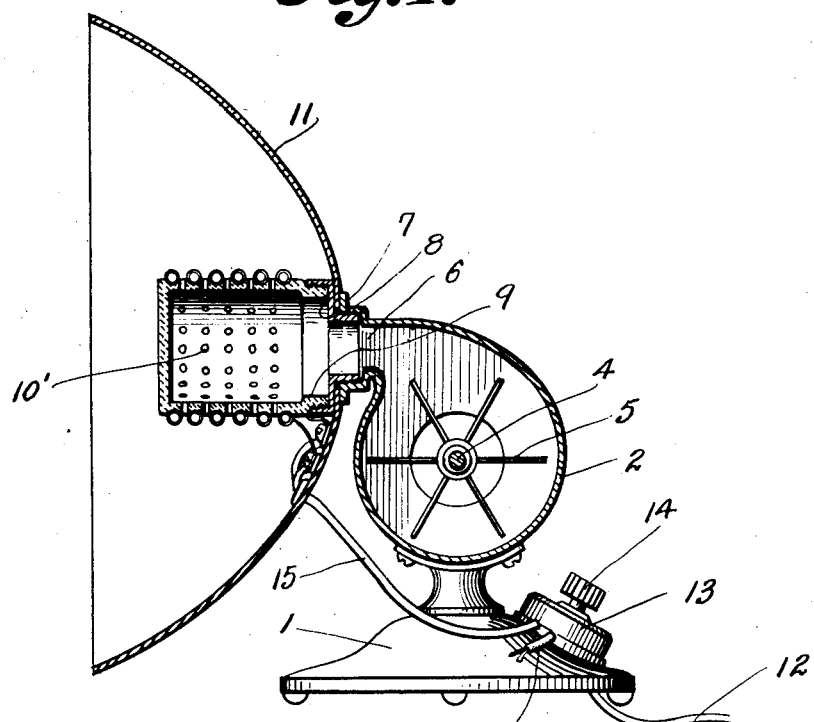
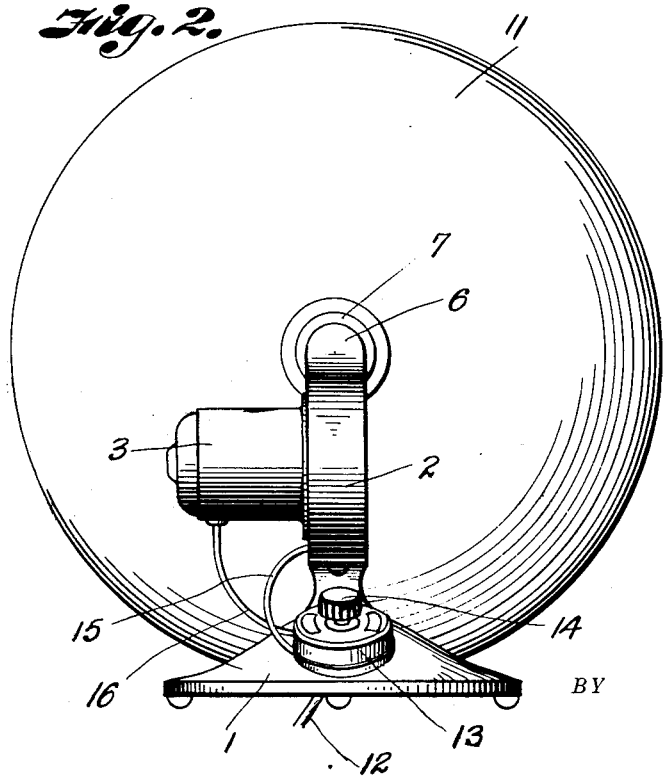
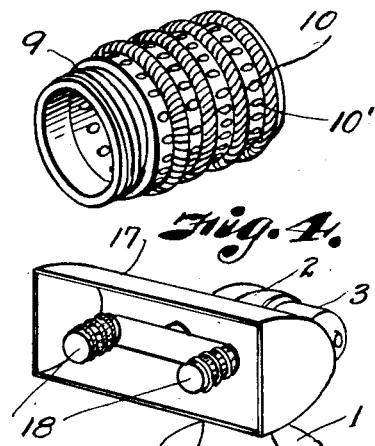
INVENTORS.
Samuel M Carmean
James H Carmean.
Arthur C. Brown
ATTORNEY Patented Apr. 21, 1925.

1,534,682

UNITED STATES PATENT OFFICE.

SAMUEL M. CARMEAN AND JAMES H. CARMEAN, OF KANSAS CITY, MISSOURI.

ELECTRIC HEATER.

Application filed April 11, 1924. Serial No. 705,772.

*To all whom it may concern:*

Be it known that we, SAMUEL M. CARMEAN and JAMES H. CARMEAN, citizens of the United States, residing at Kansas City, in the county of Jackson and State of Missouri, have invented certain new and useful Improvements in Electric Heaters; and we do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to electric heaters and the primary object is to provide an inexpensive, easily assembled heating mechanism whereby reflected heat may be furnished for heating a room and the reflected heat may be augmented by air passed over the heating element or elements.

In carrying out our invention, we provide a motor driven fan or impeller, the casing of which is supported upon a suitable base and to the outlet of the impeller casing is secured a reflector and heating element, the heating element being hollow so that air can be passed through it from the outlet of the impeller casing and we use a multiple switch so that current can be supplied to the heater to the exclusion of the air impeller or current can be supplied for the heater and air impeller motor at the same time.

The invention consists in certain novel parts and combination of parts, which will be described hereinafter, reference being had to the accompanying drawings, in which—

Fig. 1 is a vertical, longitudinal, sectional view through a heater apparatus constructed in accordance with our invention.

Fig. 2 is a rear elevational view of the heater.

Fig. 3 is a perspective view of the heating element, and

Fig. 4 is a slightly modified form of heating apparatus.

Referring now to the drawings by numerals of reference—

1 designates a base upon which is mounted an air impeller casing 2 carrying an electric motor 3 on the shaft 4 of which are air impeller blades 5. The casing 2 has an eccentric tubular outlet 6 with an offset flange 7 forming a threaded socket 8 to receive the threaded collar 9 of a tubular heating element 10 between which and the outlet end of the casing is secured a reflector 11. The reflector may be either spherical or parabolic. Current may be supplied from any suitable electrical source, for example to a conductor 12 to the double switch 13, provided with a control 14 so that current can be switched on to the heater element through conductor 15 or the control 14 can be turned so that current can be switched on for the conductor 15 and for the conductor 16, the latter supplying current to the motor 3. Since the heating element 10 has a tubular collar 9 for engagement with the socket 8, it will be apparent that when the fan or impeller is functioning, air will be forced directly through the heating element and since the heating element is a perforate tube with a closed outer end, the air heated as it passes through the heating element will be projected out through the openings 10' against the reflector into the room, the reflector radiating heat in diversified directions.

We are aware that prior to our invention, heaters and prior heating elements and reflectors have been used. We are also aware that prior to our invention, heating elements with air impellers for forcing air over the heating elements have been used, but we are not aware that the specific arrangement contemplated by our present invention has ever been used and while the preferred embodiment of our invention is shown in Figs. 1, 2 and 3, the invention is susceptible of changes, for example, instead of the single heater with the parabolic reflector, an elongated reflector 17 may be employed with a plurality of heating elements 18 as shown in Fig. 4.

In the construction shown in Fig. 4, the air will be blown through and about as many heater elements as are included in the reflector 17. The switch 13 may consist of any appropriate switch, such as are now on the market, so we have deemed it unnecessary to specifically describe or illustrate any particular switch construction.

It will be apparent that we have provided an electric heater which can be utilized either as of the reflector type or as of the reflector and blower type combined. Thus we have combined in one heating apparatus mechanism for taking care of varying conditions and the structure may be fabricated and assembled at a relatively small cost.

What we claim and desire to secure by Letters-Patent is:

A heating element comprising a cylindrical hollow member having one end closed and the other provided with an open threaded collar, the wall of the casing having perforations arranged in circular rows about the periphery of the casing and a resistance wire wound around the casing between the rows of perforations.

In testimony whereof we affix our signatures.

SAMUEL M. CARMEAN.
JAMES H. CARMEAN.